US011429793B2

(12) United States Patent
Watt, Jr. et al.

(10) Patent No.: US 11,429,793 B2
(45) Date of Patent: Aug. 30, 2022

(54) SITE AMBIENT AUDIO COLLECTION (71) Applicant: Dell Products L.P., Round Rock, TX (US)

(72) Inventors: James S. Watt, Jr., Austin, TX (US); Someshwar Mukherjee, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 16/423,569

(22) Filed: May 28, 2019

(65) Prior Publication Data

US 2020/0380078 A1  Dec. 3, 2020

(51) Int. Cl.
G10L 15/26 (2006.01)
G06F 40/40 (2020.01)
G06F 16/95 (2019.01)
G06Q 30/02 (2012.01)
G06F 16/68 (2019.01)
G06F 16/683 (2019.01)

(52) U.S. Cl.
CPC ............ G06F 40/40 (2020.01); G06F 16/685 (2019.01); G06F 16/686 (2019.01); G06F 16/95 (2019.01); G06Q 30/0201 (2013.01)

(58) Field of Classification Search
None
See application file for complete search history.

(56) References Cited

U.S. PATENT DOCUMENTS

| | | | | |
|---|---|---|---|---|
| 8,560,753 B1* | 10/2013 | Hobbs | ...................... | G09G 5/14 710/72 |
| 10,115,141 B1* | 10/2018 | Warman | .............. | H04L 63/0281 |
| 10,720,157 B1* | 7/2020 | Kapila | ............... | G06Q 30/0635 |
| 2005/0226431 A1* | 10/2005 | Mao | ...................... | G10L 21/0208 381/94.2 |
| 2007/0067305 A1* | 3/2007 | Ives | ....................... | G06Q 30/02 |
| 2010/0169763 A1* | 7/2010 | Zahavi | ................ | H04L 67/1065 715/234 |
| 2013/0041742 A1* | 2/2013 | Zhang | ................. | G06Q 30/0207 705/14.36 |
| 2013/0054250 A1* | 2/2013 | Nanavati | ............... | H04M 3/493 704/276 |
| 2014/0257890 A1* | 9/2014 | Polonsky | ............... | G06Q 30/02 705/7.11 |
| 2016/0284351 A1* | 9/2016 | Ha | ........... | G10L 15/22 |
| 2016/0329063 A1* | 11/2016 | Wige | ...................... | G06F 3/162 |
| 2016/0378424 A1* | 12/2016 | Kanda | ..................... | G08C 17/00 700/275 |

(Continued)

OTHER PUBLICATIONS

Always On: Privacy Implications of Microphone-Enabled Devices by Stacey Gray (Year: 2016).*

*Primary Examiner* — Neeraj Sharma
(74) *Attorney, Agent, or Firm* — Terrile, Cannatti & Chambers, LLP; Emmanuel A. Rivera (57) ABSTRACT

A system, method, and computer-readable medium are disclosed for improved audio collection of website ambient data. In various embodiments, when a user visits a website, audio data is collected during a website browsing session. The audio data is converted to text by Natural Language Processing (NLP) enabled device used for browsing. From the text, certain key words are identified that are relevant to a business. The identified key words can be analyzed per requirements of the business.

20 Claims, 4 Drawing Sheets

(56) References Cited

U.S. PATENT DOCUMENTS

| | | | | |
|---|---|---|---|---|
| 2018/0068103 A1* | 3/2018 | Pitkänen | .......... | G06Q 20/40145 |
| 2018/0191788 A1* | 7/2018 | Lewis | ................ | G10L 15/1822 |
| 2019/0278562 A1* | 9/2019 | Tang | ...................... | G10L 15/02 |
| 2019/0311714 A1* | 10/2019 | Barbello | ................ | G06F 40/58 |
| 2019/0377544 A1* | 12/2019 | Darachi, Jr. | ............ | G10L 15/22 |
| 2020/0135191 A1* | 4/2020 | Nourbakhsh | ........... | G10L 15/22 |
| 2020/0160844 A1* | 5/2020 | Chapman | ................ | G10L 15/07 |
| 2020/0288204 A1* | 9/2020 | Duersch | ................ | G06N 20/00 |
| 2020/0403618 A1* | 12/2020 | Simar, Jr. | ......... | H03K 19/17728 |

\* cited by examiner

SITE AMBIENT AUDIO COLLECTION

BACKGROUND OF THE INVENTION

Field of the Invention

The present invention relates to the management of information handling systems. More specifically, embodiments of the invention provide a system, method, and computer-readable medium for improved audio collection of site ambient data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Businesses can host websites which are able to collect and gather customer related information and data that can be used for various purposes, such as improving products, services, customer relations, sales, etc. In certain instances, such information and data can be collected and gathered by customer actions such as clicking on site buttons/interfaces, customer inputs to forms, determining the type of browser that a customer uses, determining source Internet Protocol (IP) address locations, etc. The information and data can all be gathered by a business during a customer browsing session.

Natural Language Processing (NLP) is a technology that allows users to communicate with various computing and information handling devices through speech. NLP continues to evolve as an interface to allow users to communicate and interact with such computing and information handling devices. For example, instead of typing out commands/instructions and reading prompts or textual feedback, through the use of NLP, a user can speak commands/instructions and listen to prompts or feedback. Various device operating systems (OS) incorporate or provide for the use of NLP. By implementing NLP, audio data/information can be converted to words or text strings. In certain device OS, implementation may be provided for recognition of certain words or text strings through NLP; however, such implementation typically involves performing an install of an application program interface (API) and providing a set limited dictionary of certain key words. Audio processing can be limited to the certain key words provided in the dictionary. Such APIs are able to detect the certain key words; however, are not configured to collect or correlate words, text strings, meta-data, etc. processed by NLP of the OS.

SUMMARY OF THE INVENTION

A system, method, and computer-readable medium are disclosed for improved audio collection of site ambient data. In various embodiments, when a user visits a website, audio data is collected during a website browsing session. The audio data is conveyed to text by Natural Language Processing (NLP) enabled device used for browsing. From the text, certain key words are identified that are relevant to a business. The identified key words can be analyzed per requirements of the business.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for audio collection of site ambient data. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
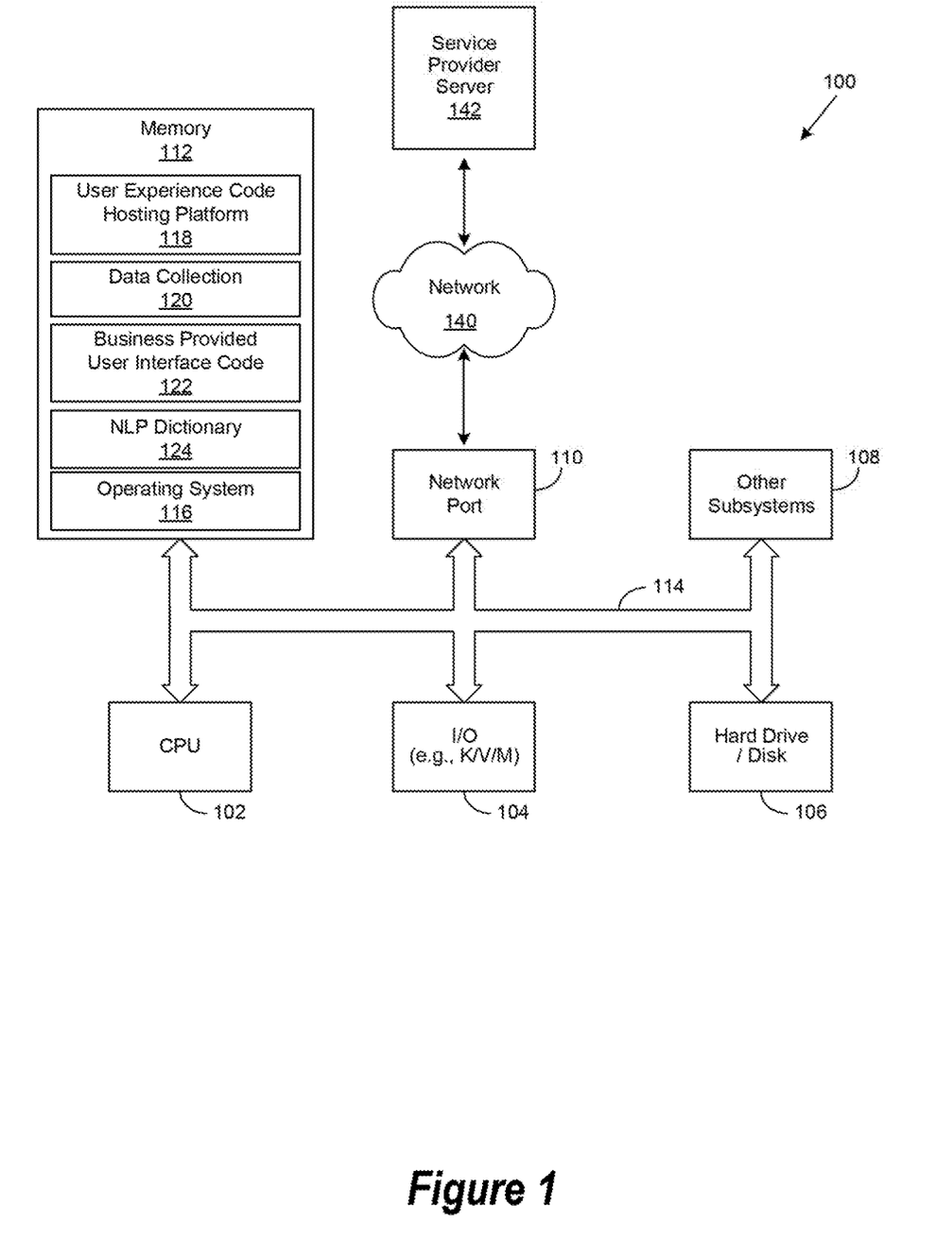
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114.

System memory 112 further includes an operating system (OS) 116 and in various embodiments may also include a user experience code hosting platform 118 and data collection 120. In certain implementations, the user experience code hosting platform 118 is configured to interact or support an external website or websites. In certain implementations, data collection 120 can be in the form of a system or application programming interface (API). The data collection 120 system or API can be configured to receive NLP processed collected site ambient audio data from one or more users, as further described below. In certain implementations, the system memory 112 can include business provided user interface code 122 that can be made available to user devices to be configured and used with a browsing interface on the user devices as further described below. Furthermore, in certain implementations, system memory 112 can further include an NLP dictionary 124 which can be implemented by user devices as further described below.

Figure 2:
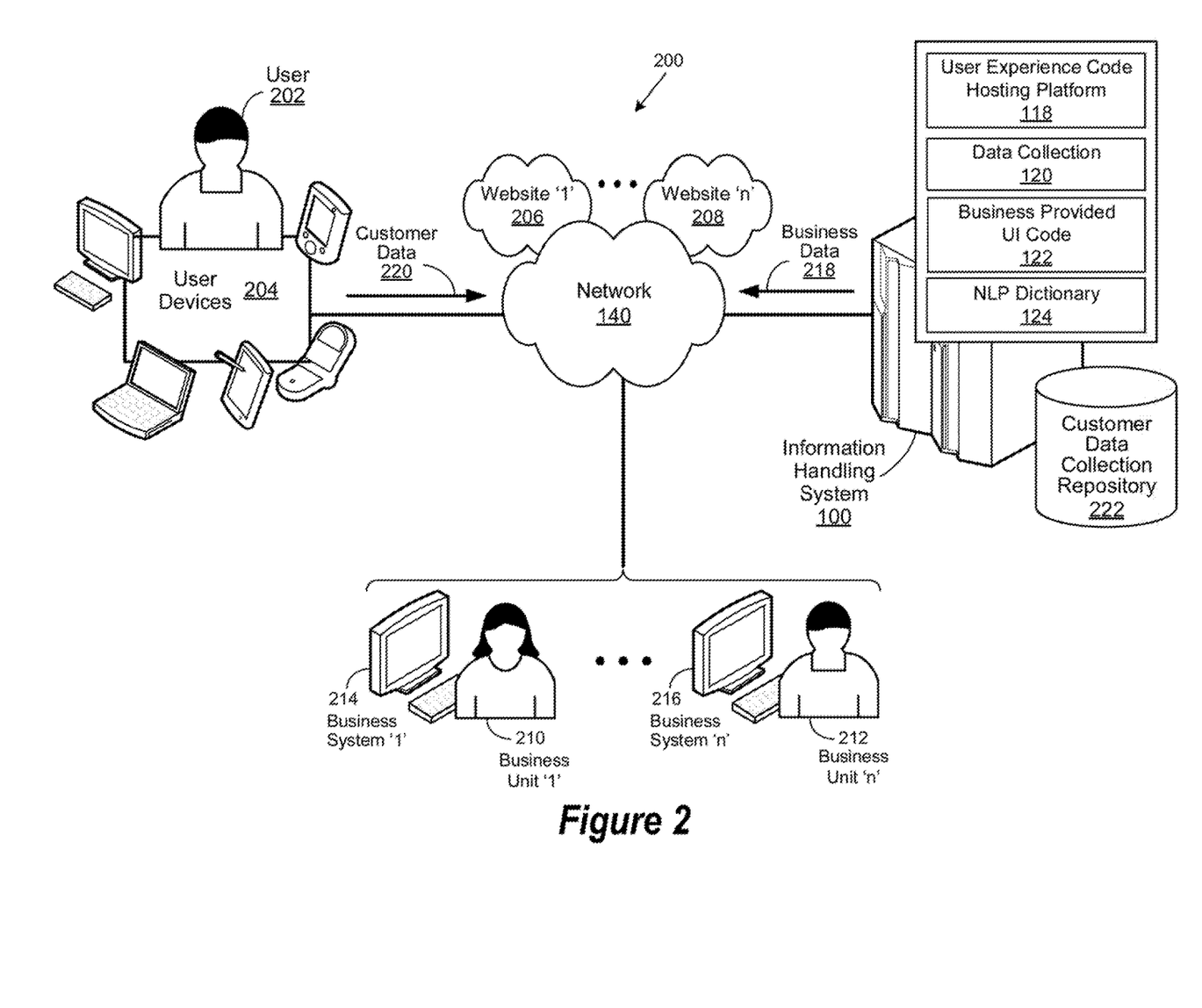
FIG. 2 is a simplified block diagram of an environment implemented in accordance with an embodiment of the invention to provide for audio collection of site ambient data file source identification system.

FIG. 2 is a simplified block diagram of an environment 200 implemented in accordance with an embodiment of the invention to provide for audio collection of site ambient data. In various embodiments, audio collection of site ambient data is performed of user 202 through user device(s) 204. User 200 can be representative of multiple users. User device(s) 204 are configured to collect audio data from user 202. User device(s) 204 can be configured to include audio sensing devices such as microphones to record or pick up voice data of user 202, where the voice data is the audio data. In certain implementations, the user device(s) are configured to be "always on" in collecting audio data. In particular, such a "always on" feature can be implemented when a user visits a particular business website as further discussed below. In other words, the audio data is "site ambient data." Such site ambient data can be converted by an OS implementing NLP on the user device(s) 204. As used herein, user device(s) 202 refers to an information handling system such as a personal computer, a laptop computer, a tablet computer, a personal digital assistant (PDA), a smart phone, a mobile telephone, television, or other device that is capable of communicating and processing data. User device(s) 202 can have the capability to implement third party code designed to display an interactive user interface over a business data transmission. Such business data transmission can be exchanged over a network 140.

In various embodiments, the user device(s) 202 is used to exchange information between the information handling system 100 through the use of a network 140. In certain embodiments, the network 140 may be a public network, such as the Internet, a physical private network, a wireless network, a virtual private network (VPN), wide area network (WAN), private area network (PAN), or any combination thereof. Skilled practitioners of the art will recognize that many such embodiments are possible and the foregoing is not intended to limit the spirit, scope or intent of the invention. The user device(s) 202 can be connected to network 140. Network 140 can include various environments, such as website '1' 206 through website 'n' 208. In certain implementations, business unit '1'' 210 through business unit "n" 212 support specific websites of website '1' 206 through website 'n' 208. For example, the business unit '1'' 210 through business unit "n" 212 can be product or service support groups, marketing groups, and other business specific groups. Communications by business unit '1' 210 through business unit "n" 212 can be to network 140 by implementing respective business system '1' 214 through business system 'n' 216.

Business unit '1' 210 through business unit "n" 212 can provide specific requirements or business data 218, as to website '1' 206 through website 'n' 208. In certain implementations, the website '1' 206 through website 'n' 208 are operated or controlled by a business or business unit, such as business unit '1' 210 through business unit "n" 212. Such requirements can be provided by user experience code hosting platform 118. In addition, particular user interface code by business unit '1' 210 through business unit "n" 212, can be provided by business provided code 122. The business provided UI code 122 can be implemented to detect the OS, browser and feature sets that are resident at user device 204. The business provided UI code 122 can further detect if the OS is NLP enabled, and instruct the OS to collect ambient audio data.

In certain implementations, the business provided UI code 122 can be directly accessed by user devices 204. The business provided UI code 122 can communicate with a browsing user interface at user devices 204, as further discussed below. In certain implementations, when user 202 visits a website '1' 206 through website 'n' 208, ambient audio data is collected. Such ambient audio data can be part of customer data that 220 that is sent from user devices 204. Information handling system 100 through data collection 120 can receive the customer data. In certain implementations, the customer data is stored in a customer data collection repository 222. The customer data collection repository 222 can be a "data lake", analytics database, or any data collection service/entity/device/etc.

Figure 3:
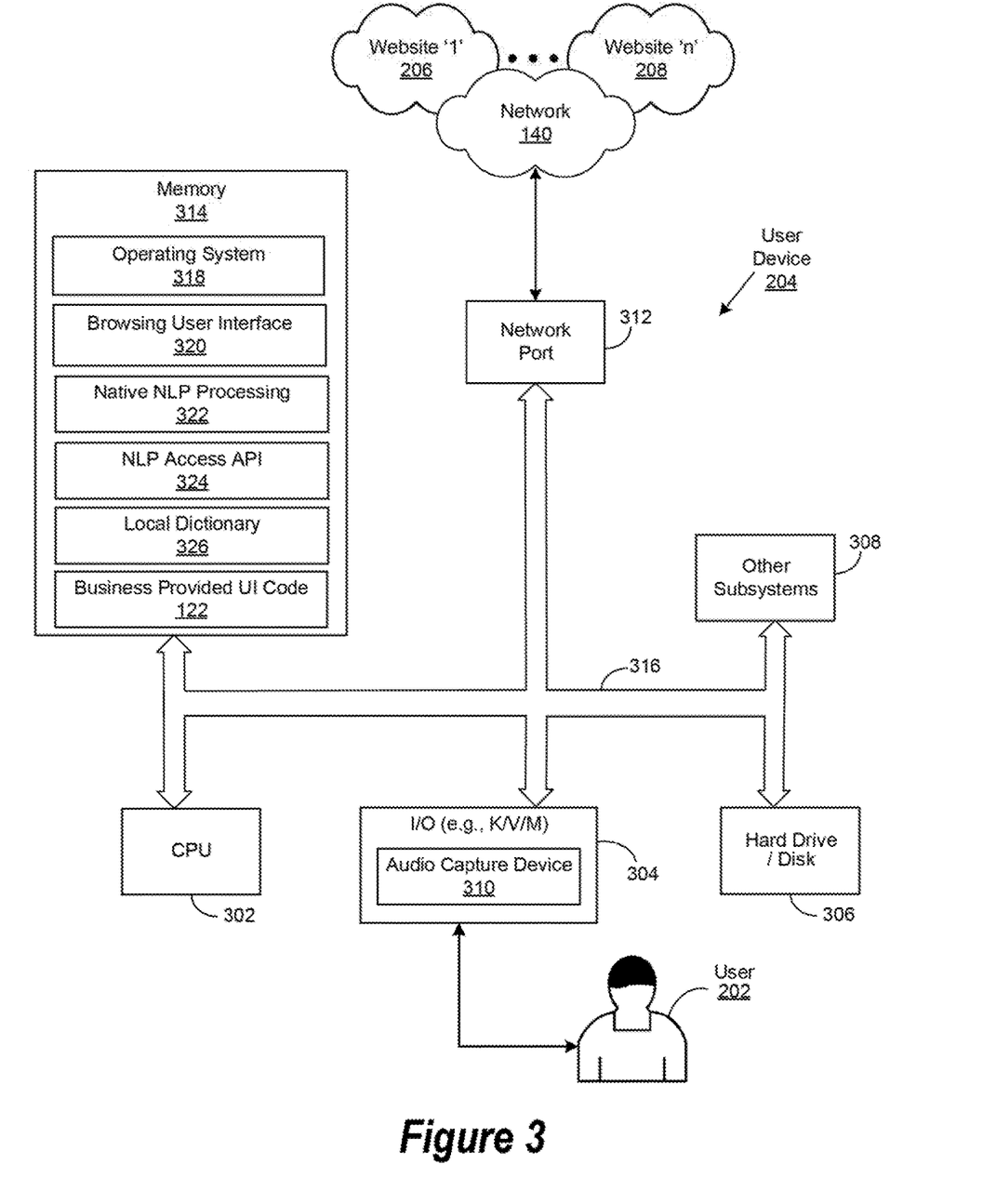
FIG. 3 is a general illustration of components of user device as implemented in the system and method of the present invention.

FIG. 3 is a generalized illustration of user device 204 that can be used to implement the system and method of the present invention. The user device 204 includes a processor (e.g., central processor unit or "CPU") 302, input/output (I/O) devices 304, such as a microphone, a keyboard, a video/display, a mouse, and associated controllers (e.g., K/V/M), a hard drive or disk storage 306, and various other subsystems 308. User 202 can interact with the user device 204 through I/O devices 304. In specific, when collecting site ambient data from user 202, an audio capture device 310 (e.g. microphone) can be implemented to capture voice data from of user 202 when user device 204 connects to a particular website (i.e., user 202 visits a particular website), such as website '1' 206 through website 'n' 208. In certain implementations, the audio capture devices 310 is "always on", and user device is configured to collect ambient audio data as the user visits website '1' 206 through website 'n' 208. Website '1' 206 through website 'n' 208 can include homepages, product pages, service pages, etc. For certain implementations, the "always on" feature can be initiated or triggered by user 202. In various embodiments, the user device 204 also includes network port 312 operable to connect to the network 140. As discussed, the network 140 can include website '1' 206 through website 'n' 208.

The user device 204 likewise includes system memory 314, which is interconnected to the foregoing via one or more buses 314. System memory 314 can further include an operating system (OS) 318 and in various embodiments can also include a browsing user interface 320, native NLP processing (module) 322, NLP access application program interface (API) 324 and local dictionary 326. The local dictionary 326 can provide for a dictionary of terms that can be accessed by the NLP access application program interface (API) 324. In certain implementations, business units such as business unit '1' 210 through business unit "n" 212, can provide specific dictionaries used as local dictionary 326. Such specific dictionaries can include particular terms or words that are relevant or specific to the business unit. The business provided user interface code 122 can also be included in system memory 314. In certain implementations, the business provided user interface code 122 can be a preinstalled application by a business on end user device 204, such as preinstalled software applications in a laptop, phone, etc. The business provided user interface code 122 and local dictionary 326 can be updated as needed or on a regular basis. The business provided user interface code 122 can be a Java® script that runs on a webpage/website, such as website '1' 206 through website 'n' 208.

The user device 204 can capture site ambient data of user 202. In certain implementations, the user device 204 implements an OS 318 that is NLP enabled, and can include a "personal digital assistant" such as Apple Siri®, Amazon Alexa®, and Microsoft Cortana®. In certain implementations, native NLP processing (module) 322 322 captures NLP data of the ambient audio. The user device 204 through native NLP processing (module) 322 can allow third party access to the captured NLP data.

In certain implementations, the browsing user interface 320 is provided by the business provided user interface code 122 as described in FIGS. 1 and 2. While user 202 is navigating the browsing user interface 320, the browsing, user interface 320 can utilize the NLP access API 324 to retrieve words (text, strings) processed by the native NLP processing (module) 322. In particular, the NLP access API 324 can be configured to collect (retrieve) information or data that is relevant to particular business units, such as business unit '1' 210 through business unit "n" 212 as described in FIG. 2. As discussed, business unit '1' 210 through business unit "n" 212 can provide specific dictionaries that provide for particular words, texts, phrases that are relevant to a business unit. Furthermore, site ambient data collected when a user visits a website (i.e., audio collection of site ambient data), such as website '1' 206 through website 'n' 208, can include customer information, what customer was visiting or viewing. Collected ambient audio data can also include customer sentiment and experience as to products and/or services.

Now referring back to FIG. 2, in certain implementations, business data 218 can include the NLP dictionary 124 along with the business provided user interface code 122. The NLP dictionary 124 can be installed at user device 204 as the local dictionary 326 of FIG. 3. A reduction in noise or of irrelevant terms that are provided to the business provided user interface code 122 is possible by limiting words (text, strings) to what is made available by local dictionary 326.

In certain implementations, the business provided user interface code 122 takes captured words (text, string) and can append them to customer data 220. In certain implementations, the words (text, string) are appended as metadata. In certain implementations, the business provided user interface code 122 proxies the customer data 220 along with meta-data from the user device 204 to the information handling system 100. This customer data 220 and meta-data data can be transmitted back to data collection 120. In certain implementations, data collection 120 is an API that can include certain services, such as Representational State Transfer (REST) endpoints or similar, that can be hosted as part of the hosting platform 118. Such services can be dedicated for audio collection and can also be used for capturing other user 202 data (e.g., mouse clicks, etc.).

In certain implementations, the data collection (i.e., API) 120 can sort through customer data 220, pull audio keywords and tag such information or data with other relevant customer data (e.g., IP addresses, session IDs, page URLs, session times and dates, etc.). The processed information or data (i.e., NLP processed audio data) can be passed along to the customer data collection repository 222. In certain implementations, retrieved words from data collection repository 222 can be stored together with grammatical order, such that phrases can be extracted from stored data. For example, the words "the", "dog", "ran", and "away" are not stored in a way that the original sentence cannot be reconstructed. The processed information or data can be further analyzed. In certain implementations, the customer data collection repository 222 can make available the NLP processed audio data in "bulk" for business analysis to be used for various purposes, such as data mining. For example, data mining can include determining general experiences and sentiments of customers/users when visiting particular sites, regarding products/services. From such determining businesses can improve products and services, addresses customer issues, and increase sales, etc.

Figure 4:
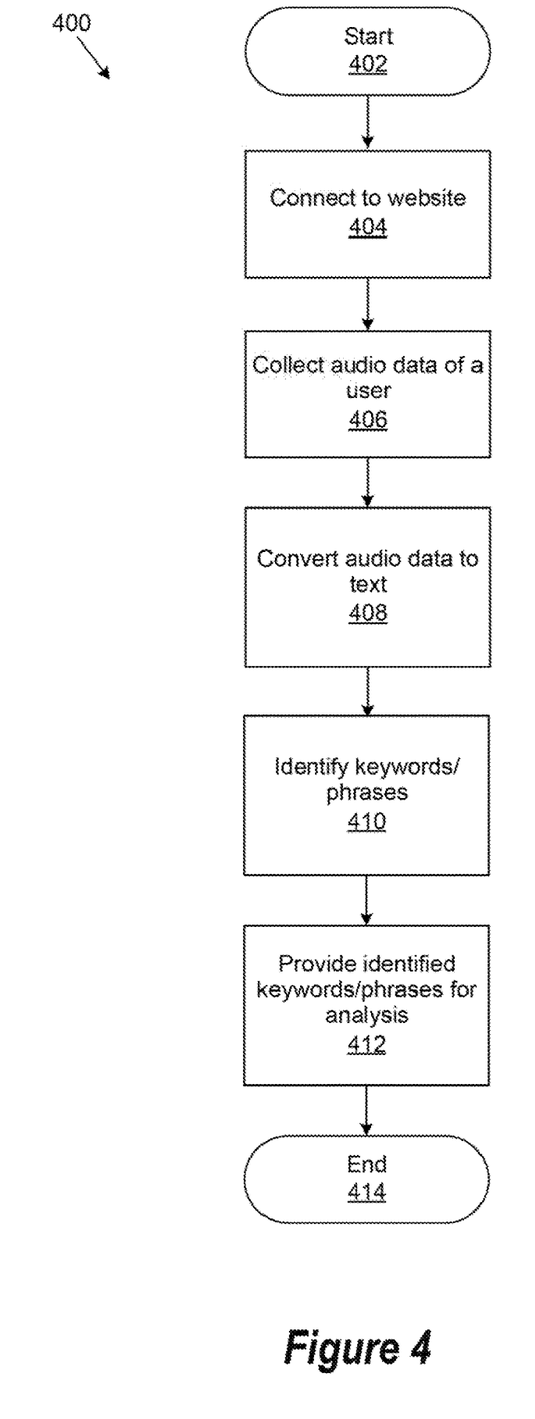
FIG. 4 is a general flowchart for audio collection of site ambient data.

FIG. 4 is a generalized flowchart 400 for audio collection of site ambient data. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware; or a combination thereof, without departing from the scope of the invention.

At block 402 the process 400 starts. At step 404, a user device connects to a particular website. The website can be a business operated website, and operated by a particular business unit. The websites can include various webpages and provide information as to specific products and/or services. At step 406, audio data of a user is collected during a website browsing session. The audio data can be collected as long as the website browsing session takes place, providing an "always on" collection of the audio data. At block 408, the collected audio data is convened to text (e.g., words). The conversion can be performed by a Natural Language Processing (NLP) enabled operating system or an NLP processing module. At block 410, certain keywords, text, and/or phrases are identified. The certain keywords, text, and/or phrases can be determined by the particular business unit. In certain implementations, the certain keywords, text, and/or phrases are included in a dictionary as defined by the particular business unit. At block 412, the identified keywords, text, and/or phrases are collected and provided for analysis. The identified keywords, text, and/or phrases can be associated with the user and/or website browsing session. At block 414, the process 400 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in, all respects.

What is claimed is:

1. A computer-implementable method for audio collection of website ambient data comprising:
    connecting to a particular website;
    collecting ambient audio data of a user during a website browsing session, wherein the collected ambient audio data of the user is specific to the particular website and includes user sentiment and experience related to products and services of a business supported by the particular website and the collecting ambient audio data is always on while at the website;
    converting the collected ambient audio data to text;
    sorting through the text and pulling key words and tagging with relevant user data that includes IP addresses, session IDs, page URLs, session times, and dates;
    identifying certain key words of the text that are relevant to the business;
    providing the identified certain key words for further sentiment analysis; and
    performing the sentiment analysis on the identified certain key words.

2. The method of claim 1, wherein the particular website is operated by the business and user interface code for the website is provided by the business.

3. The method of claim 1, wherein the collecting the audio data of the user is continuous during the website browsing session.

4. The method of claim 1, wherein the converting is performed by a Natural Language Processing (NLP) module or NLP enabled operating system.

5. The method of claim 1, wherein the identifying certain key words is performed using a dictionary provided by the business.

6. The method of claim 1 wherein the providing includes customer data wherein the certain key words are attached as meta data to the customer data.

7. The method of claim 1 further comprising associating the certain key words with actions performed by the user during the website browsing session.

8. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for improved management of unattended user queries and comprising instructions executable by the processor and configured for:

connecting to a particular website;

collecting ambient audio data of a user during a website browsing session, wherein the collected ambient audio data of the user is specific to the particular website and includes user sentiment and experience related to products and services of a business supported by the particular website and the collecting ambient audio data is always on while at the website;

converting the collected ambient audio data to text;

sorting through the text and pulling key words and tagging with relevant user data that includes IP addresses, session IDs, page URLs, session times, and dates;

identifying certain key words of the text that are relevant to the business;

providing the identified certain key words for further sentiment analysis; and performing the sentiment analysis on the identified certain key words.

9. The system of claim 8, wherein the particular web site is specific to business.

10. The system of claim 8, wherein the collecting the audio data is activated by the user.

11. The system of claim 8, wherein the converting is performed by a Natural Language Processing (NLP) module or NLP enabled operating system.

12. The system of claim 11, wherein identifying includes an NLP access API to retrieve the texts.

13. The system of claim 8, wherein the identifying certain key words is performed using a local dictionary.

14. The system of claim 8 further comprising associating the certain key words with actions performed by the user during the website browsing session.

15. A non-transitory, computer-readable storage medium embodying computer program code, the computer program code comprising computer executable instructions configured for:

connecting to a particular website;

collecting ambient audio data of a user during a website browsing session, wherein the collected ambient audio data of the user is specific to the particular website and includes user sentiment and experience related to products and services of a business supported by the particular website and the collecting ambient audio data is always on while at the website;

converting the collected ambient audio data to text;

sorting through the text and pulling key words and tagging with relevant user data that includes IP addresses, session IDs, page URLs, session times, and dates;

identifying certain key words of the text that are relevant to the business;

providing the identified certain key words for further sentiment analysis; and performing the sentiment analysis on the identified certain key words.

16. The non-transitory, computer-readable storage medium of claim 15, wherein the particular website is controlled by a business unit of the business.

17. The non-transitory, computer-readable storage medium of claim 15, wherein collecting the audio is continuous during the website browsing session.

18. The non-transitory, computer-readable storage medium of claim 15, identifying certain key words is performed using a dictionary of key words.

19. The non-transitory, computer-readable storage medium of claim 15, wherein the providing includes customer data wherein the certain key words are attached as meta data to the customer data.

20. The non-transitory, computer-readable storage medium of claim 15 further comprising associating the certain key words with actions performed by the user during the website browsing session.

* * * * *